(12) United States Patent
Iwane

(10) Patent No.: US 6,973,264 B2
(45) Date of Patent: Dec. 6, 2005

(54) FOCAL POINT DETECTION APPARATUS, FOCUSING SYSTEM, CAMERA, AND FOCAL POINT DETECTION METHOD

(75) Inventor: Toru Iwane, Chiyoda-ku (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 10/490,548

(22) PCT Filed: Sep. 26, 2002

(86) PCT No.: PCT/JP02/09968

§ 371 (c)(1),
(2), (4) Date: Oct. 19, 2004

(87) PCT Pub. No.: WO03/029870

PCT Pub. Date: Apr. 10, 2003

(65) Prior Publication Data

US 2005/0036779 A1      Feb. 17, 2005

(30) Foreign Application Priority Data

Sep. 27, 2001 (JP) ............................. 2001-296715

(51) Int. Cl.⁷ ............................................. G03B 13/36
(52) U.S. Cl. ..................... 396/111; 396/121; 250/201.7
(58) Field of Search . 396/111, 119, 121; 348/345–356; 250/201.2, 201.7

(56) References Cited

U.S. PATENT DOCUMENTS

| 4,453,818 A | * | 6/1984 | Hayashi et al. | ............. 396/119 |
| 4,488,799 A | * | 12/1984 | Suzuki et al. | ............... 396/119 |

FOREIGN PATENT DOCUMENTS

| JP | A 59-034504 | 2/1984 | ............ G02B 7/11 |
| JP | A 04-333010 | 11/1992 | ............ G02B 7/38 |
| JP | A 07-084177 | 3/1995 | ............ G02B 7/28 |

* cited by examiner

*Primary Examiner*—W. B. Perkey
(74) *Attorney, Agent, or Firm*—Oliff & Berridge PLC

(57) ABSTRACT

First to third liquid crystal filters are arranged at first to third different distances from a predeterminate image formation surface. Light flux passing through the liquid crystal filters is received by a photodiode and converted into an electric signal. A variable-density stripe pattern of a predetermined space frequency is formed on the first liquid crystal filter while the second and the third liquid crystal filter are in the state of entire transparency and a first signal is output from the photodiode. Similarly, a variable-density stripe pattern is formed on the second liquid crystal filter while the first and the third liquid crystal filter are in the state of entire transparency and a second signal is output. Similarly, a variable-density stripe pattern is formed on the third liquid crystal filter while the first and the second liquid crystal filter are in the state of entire transparency and a third signal is output. According to the first, second, and third signals, a focal point position is calculated.

18 Claims, 14 Drawing Sheets

15 15
(2C) 15 (2A)
(2B)

TRANSMISSION AREA  NON-TRANSMISSION AREA

FIG. 14
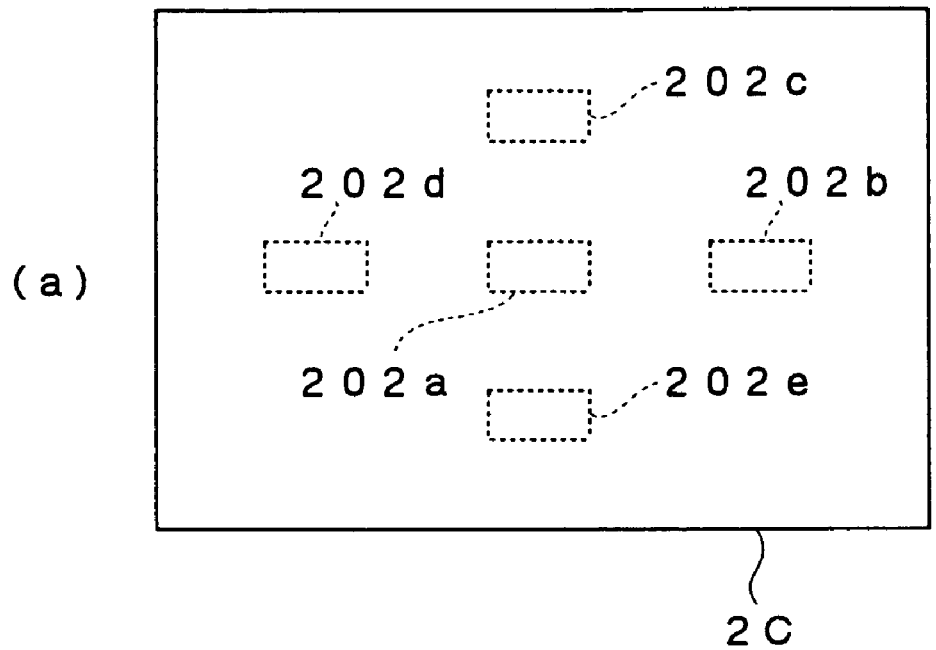
(a)
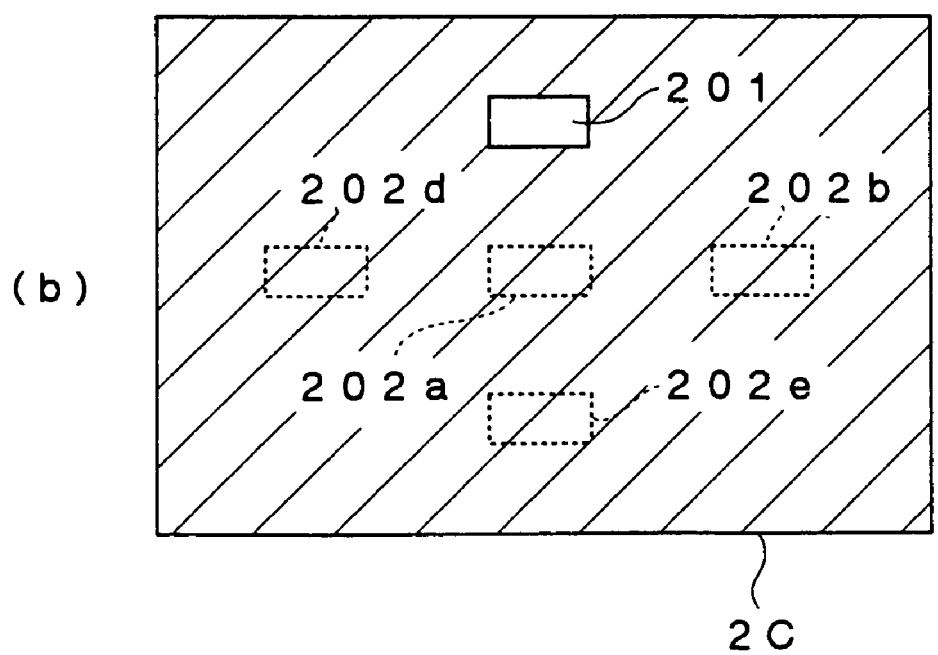
(b)

FOCAL POINT DETECTION APPARATUS, FOCUSING SYSTEM, CAMERA, AND FOCAL POINT DETECTION METHOD

TECHNICAL FIELD

The present invention relates to a focal point detection device that detects the focal point position of an optical system, a focus system achieved by using the focal point detection device, a camera having the focus system and a focal point detection method that may be adopted to detect the focal point of an optical system.

BACKGROUND ART

Autofocus systems used in cameras and the like in the known art adopt a phase difference method, an active method or the like. In the phase difference method, a virtual pupil is set at a position at which light exits the lens and the focal point position is determined based upon parallax. The phase difference method may be implemented in conjunction with a CCD array having numerous CCDs each provided in correspondence to a specific parallax. Under normal circumstances, a field lens is set at a position that is conjugate with a film surface or a plane at which focus is assumed to be achieved, image-forming optical systems each corresponding to one of the CCDs at the CCD array are disposed at a stage rearward relative to the field lens and images are formed at the individual CCDs with the measurement target light flux. Since the focal point is measured at a position conjugate with the corresponding image-forming plane, the focus state at the image-forming position can be ascertained substantially directly in the phase difference method.

In the active method, infrared light is usually irradiated on the subject, light reflected off the subject is received at light-receiving elements such as SPDs (silicon photodiodes) disposed to achieve a specific base length and a distance is measured by adopting the principal of trigonometry. In other words, the distance to the subject is determined through the active method instead of directly determining the focus state. For this reason, an autofocus device adopting the active method needs to drive out the objective lens to an extent corresponding to the distance to the subject.

There is another autofocus method, i.e., the so-called contrast method, which is adopted in electronic image-capturing apparatuses such as video cameras and digital cameras. In this method, an image is captured with an image-capturing element by driving a focusing lens and the focus state is ascertained based upon the output from the image-capturing element. Under normal circumstances, it is assumed that the focused state is achieved when the contrast information with regard to the captured image indicates the maximum level. This method has an advantage in that since the same image-capturing element is used to detect the focus state, the detection can be executed free of any adverse effect of a mechanical error, an adjustment error or the like.

When detecting the focal point by adopting the phase difference method, CCDs need to be provided in correspondence to the detection areas and parallax, and also it is necessary provide image-forming optical systems each in correspondence to one of the CCDs. For this reason, it is technically difficult to distribute AF areas over the entire subject image plane due to restrictions imposed by the structure of the optical system, and only several AF areas are normally set. In addition, once the system is manufactured by adopting a specific structure, the system structure cannot be readily modified, and thus, the structure cannot be adjusted in correspondence to varying operating conditions.

An autofocus system adopting the active method is a distance measuring device as explained above and, for this reason, it cannot be utilized as an autofocus system with a feedback loop that interlocks with the objective lens. In other words, it can only be used as an open system, which is bound to be readily affected by any apparatus assembly/adjustment error and whatever transpires in the system before the autofocus operation is executed. Thus, it cannot be a strong, high precision system that allows correction.

The contrast method, in which a peak in contrast is detected by moving the lens while capturing an image, has been found less than ideal in terms of focusing speed. Namely, the AF signal can only be updated at a video rate and the contrast peak is only discerned after the lens passes through the focus point, and thus, there is a problem in that a considerable length of time elapses before the lens is set at the focus point.

DISCLOSURE OF THE INVENTION

An object of the present invention is to provide a focal point detection device adopting a simple structure that is capable of detecting a focal point position with ease, a focus system achieved by using the focal point detection device, a camera having the focus system and a focal point detection method.

The focal point detection device according to the present invention comprises a plurality of spatial modulation optical filters, having transmission characteristics with a predetermined spatial frequency, which modulate an image-forming light flux from an optical system at different positions on an optical axis, a photoelectric conversion unit that receives light via the individual spatial modulation optical filters and individually outputs signals in correspondence to varying intensities of the light having been received and an arithmetic unit that calculates a focal point position of the optical system based upon the signals output by the photoelectric conversion unit.

The spatial modulation optical filters may each be constituted with a transmission-type liquid crystal filter. In such a case, the individual transmission-type liquid crystal filters should be controlled by a liquid crystal control unit so that a transmission characteristics pattern with specific spatial frequency is formed at one of the plurality of transmission-type liquid crystal filters while each remaining transmission-type liquid crystal filter is set in a state of full transmission. Namely, a plurality of sets of data should be obtained at the photoelectric conversion unit and the focal point position should be calculated based upon the plurality of sets of data.

An aperture pattern may be formed at one of the plurality of transmission-type liquid crystal filters, a transmission characteristics pattern with a specific spatial frequency may be formed at one of the other transmission-type liquid crystal filters or at the aperture pattern and each transmission-type liquid crystal filter having neither the aperture pattern nor the transmission characteristics pattern formed therein may be set in a state of full transmission. In addition, the aperture pattern may be formed at an arbitrary position in the display area of the transmission-type liquid crystal filter.

The spatial frequency may be altered. In such a case, the spatial frequency should be increased under conditions in which the extent of offset from the focal point position of the optical system is significant and the spatial frequency should be reduced under conditions in which the extent of offset is small.

It is desirable to constitute the photoelectric conversion unit with a photodiode, a photomultiplier or a CdS, having a light-receiving area over which the entire light flux from the optical system can be received in full.

The plurality of liquid crystal filters may be provided as an integrated optical block having each liquid crystal filter set between transparent glass plates. In this case, it is desirable to dispose a first polarizing plate that converts the incident light flux to linearly polarized light at a light flux entry surface of the optical block and to dispose a second polarizing plate achieving a polarization angle equal to the polarization angle on the first polarizing plate at a light flux exit surface of the optical block.

When the focal point detection device includes three liquid crystal filters, first through third liquid crystal filters should be disposed over three different distances, i.e., first through third distances, from an estimated image-forming plane. In this case, a light flux transmitted through the liquid crystal filters is received at the photoelectric conversion unit constituted of a photodiode or the like and is converted to an electrical signal. The photodiode outputs a first signal with a variable-density stripe pattern with a predetermined spatial frequency formed at the first liquid crystal filter and the second and third liquid crystal filters set in a state of full transmission. Likewise, the photodiode outputs a second signal with a variable-density stripe pattern with a predetermined spatial frequency formed at the second liquid crystal filter and the first and third liquid crystal filters set in a state of full transmission, and the photodiode outputs a third signal with a variable-density stripe pattern with the predetermined spatial frequency formed at the third liquid crystal filter and the first and second liquid crystal filters set in a state of full transmission. Then, the focal point position is calculated by using the first through third signals.

The focus system according to the present invention comprises an optical system that forms an image of a subject, a focal adjustment unit that adjusts a focal point position of the optical system, the focal point detection device described above and a focus control unit that controls the focal adjustment unit so as to set the focal point position of the optical system to a specific position based upon the focal point position detected by the focal point detection device. This focus system may be mounted at a camera.

The focal point detection method according to the present invention comprises steps for modulating an image-forming light flux from an optical system at different positions on an optical axis by using spatial modulation optical filters having transmission characteristics with a predetermined spatial frequency, sequentially receiving at a photoelectric conversion unit individual light fluxes obtained by modulating the image-forming light flux at the different positions and calculating a focal point position of the optical system based upon signals sequentially output by the photoelectric conversion unit.

The transmission characteristics pattern mentioned above, i.e., the modulation pattern, is a variable-density stripe pattern that repeats in cycles defined by the predetermined spatial frequency. Such a variable-density stripe pattern may have a transmission factor corresponding to the Fourier cos wave or a transmission factor corresponding to the Fourier sin wave. A light flux passing through the variable-density stripe pattern with such a transmission factor undergoes Fourier transformation to enable an analysis of the spatial frequency component with a predetermined spatial wavelength at a specific position of the corresponding filter. In other words, since the spatial frequency component is attenuated in correspondence to the extent of image offset from the focal point position, the image offset quantity can be calculated based upon a plurality of signal intensity levels corresponding to the light fluxes transmitted through the plurality of spatial modulation optical filters such as a plurality of liquid crystal filters.

In addition, a first variable density stripe pattern may be formed at the liquid crystal filters or the like to enable the photoelectric conversion unit to obtain filtering data defined by an even function, a second variable density pattern manifesting a 90° phase difference relative to the phase of the first variable-density stripe pattern may be formed at the liquid crystal filters or the like to obtain filtering data defined by an odd function and the focal point position may be calculated based upon these data. More specifically, the focal point position can be calculated by using an average of the absolute values of the even function filtering data and the odd function filtering data. Thus, with the data obtained by using the filters manifesting a 90° phase difference from each other, an accurate focal point detection can be achieved even when the focal point detection target is a dynamic object.

According to the present invention, the position at which the light intensity level peaks, detected by the photoelectric conversion unit, matches the focal point position of the optical system, and thus, the focal point position of the optical system can be ascertained with ease by calculating a signal peak position based upon the individual signals resulting from modulating the image-forming light flux at the different positions on the optical axis. Furthermore, the device structure can be simplified by using the photoelectric conversion unit to detect the intensity levels of the light fluxes resulting from modulating the image-forming light flux at the spatial modulation optical filters or the transmission-type liquid crystal filters.

BRIEF DESCRIPTION OF THE DRAWINGS

FIGS. 14(*a*) and 14(*b*) show the arrangements of the window forming areas 202*a* to 202*e*;

BEST MODE FOR CARRYING OUT INVENTION

The following is an explanation of the embodiments of the present invention, given in reference to the drawings.

First Embodiment (Device Structure)

Figure 1:
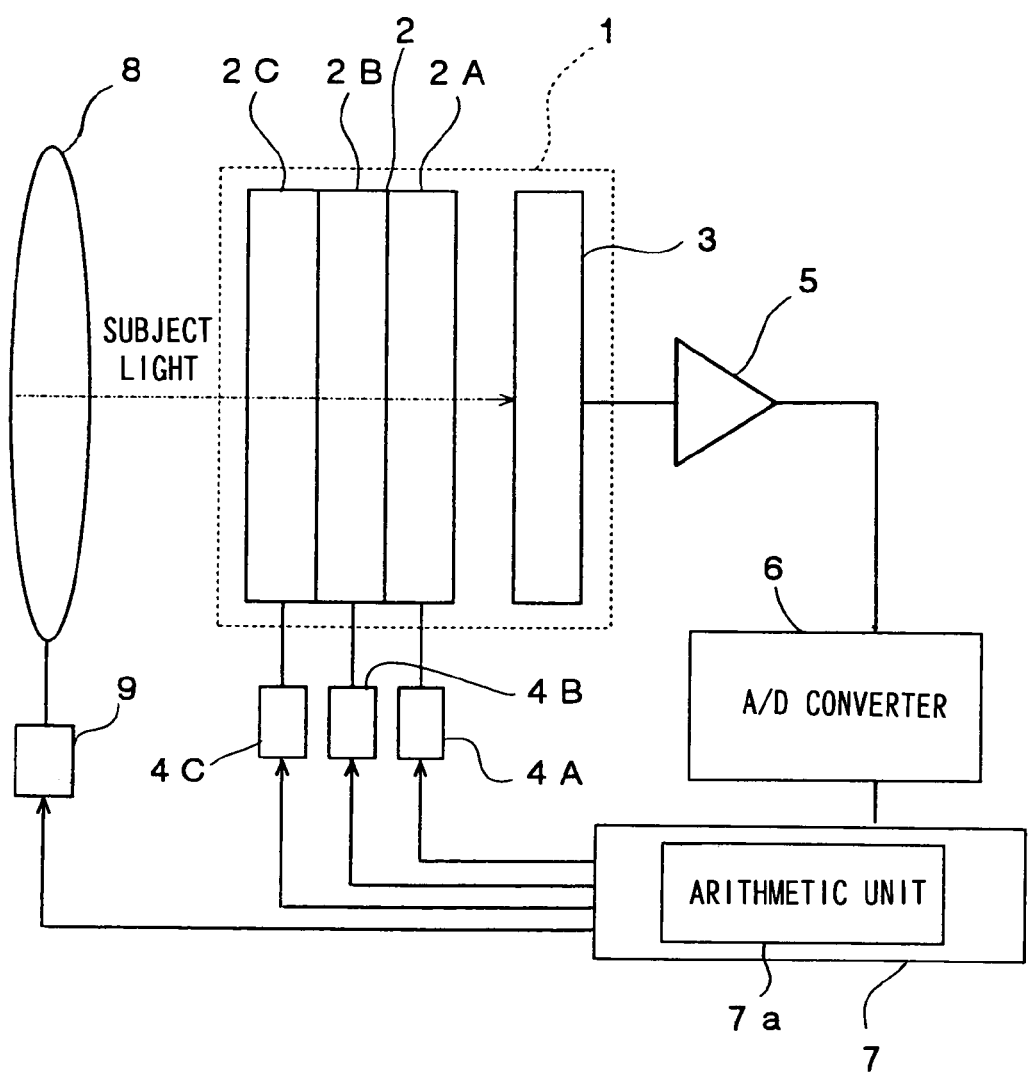
FIG. 1 is a block diagram of the focal point detection device achieved in a first embodiment of the present invention.

FIG. 1 is a schematic block diagram of the structure of an autofocus system that includes the focal point detection device achieved in the first embodiment of the present invention. Subject light exiting a photographic lens 8 is detected at a detection unit 1. The detection unit 1 includes a filter block 2 and a photodiode 3 constituting a photoelectric conversion element. The photoelectric conversion element may instead be constituted with a CdS, for instance. While the detection unit 1 is shown rearward relative to the photographic lens 8 in FIG. 1, the detection unit 1 is actually disposed at a position that is substantially conjugate with the image-capturing plane or an estimated focus-matching plane. While the subject light having passed through the lens 8 is guided to silver halide film, a CCD image-capturing element or the like (not shown), it is split in the optical path and thus some of the subject light enters the detection unit 1 as well.

The filter block 2 includes three filters 2A, 2B and 2C which are sequentially disposed along the optical axis so that the filter 2A is set closest to the photodiode 3, the filter 2B is set next to the filter 2A and the filter 2C is set furthest from the photodiode 3. As detailed later, the filters 2A to 2C are each constituted of a liquid crystal filter, and the states of the liquid crystals at the filters 2A to 2C are controlled by filter control units 4A to 4C respectively, independently of one another. An output from the photodiode 3 is first amplified at an amplifier 5, the amplified output is converted to a digital signal at an A/D converter 6 and the digital signal is then input to a control device 7. An arithmetic unit 7*a* of the control device 7 calculates a focal point detection state based upon the signal input thereto. The control device 7 controls the filter control units 4A to 4C and also controls a lens drive device 9 to enable an autofocus operation.

Figure 2:
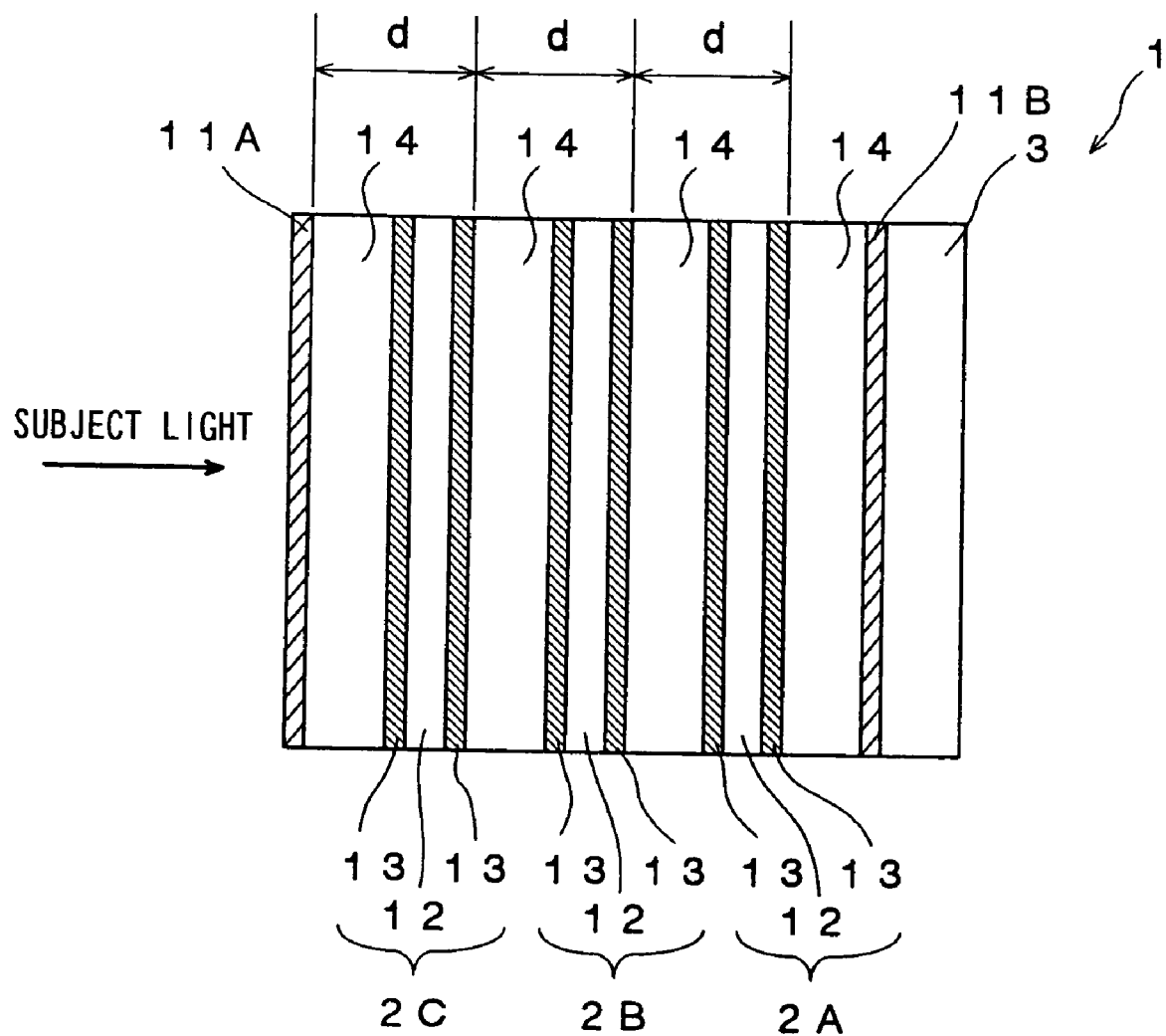
FIG. 2 shows in detail the detection unit 1.

FIG. 2 shows the structure adopted in the detection unit 1. In FIG. 2, reference numerals 11A and 11B each indicate a polarizing plate and reference numeral 14 indicates a glass substrate. The glass substrates 14 are positioned over a predetermined pitch d. The filters 2A to 2C are each set between a pair of glass substrates 14. It is to be noted that the focal point detection is executed by receiving the subject light flux in its entirety in the embodiment. Accordingly, the light-receiving surface at the photodiode 3 ranges over an area large enough to fully contain the entire subject image at the image plane. However, if the focal point detection is executed by using only a portion of the subject light flux, the light-receiving surface only needs to range over an area large enough to cover that portion.

Figure 3:
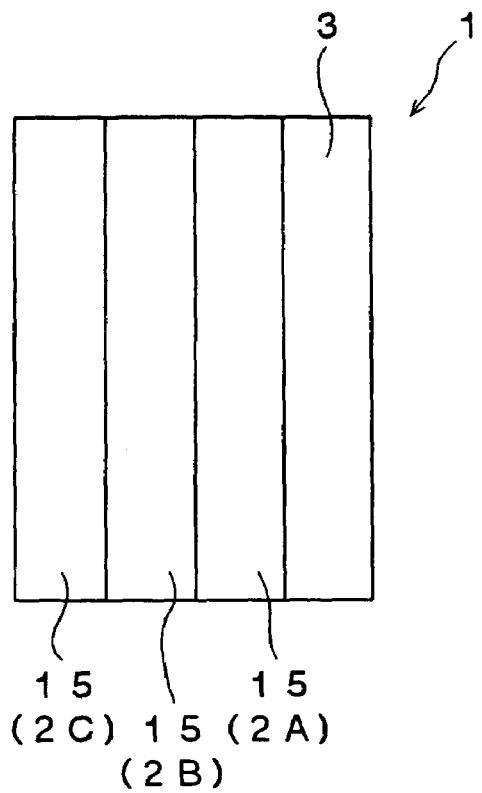
FIG. 3 presents another example of the detection unit 1.

As shown in FIG. 2, the filters 2A to 2C are each constituted of a pair of transparent conductive films 13 and a liquid crystal 12 set between the transparent conductive films. The four glass substrates 14 and the three sets of filters 2A to 2C are enclosed between the polarizing plates 11A and 11B. Since the glass substrates 14 are disposed with the pitch d as described earlier, the filters 2A to 2C, too, are set over the interval d. It is to be noted that while the common polarizing plates 11A and 11B are shared by the three layers of liquid crystals 12 in FIG. 2, three independent transmission-type liquid crystal panels 15 each having a pair of polarizing plates may be stacked to constitute the filters 2A to 2C, as shown in FIG. 3, instead.

The subject light flux having entered the detection unit 1 from the left side in FIG. 2 is polarized at the polarizing plate 11A to become linearly polarized light. The polarization angle of this light is altered as it passes through the liquid crystals 12 of the individual filters 2A to 2C. As a result, the intensity level of the light exiting the polarizing plate 11B is determined by the angle formed with the transmission axis of the polarizing light 11B and the direction along which the linearly polarized light oscillates. For instance, when δ represents the angle formed by the transmission axis and the oscillating direction, the intensity level of the transmitted light is in proportion to $(\cos \delta)^2$. In other words, by controlling the liquid crystal filters 2A to 2C with the filter control units 4A to 4C so as to adjust the extent of change in the polarization angle occurring as the light flux passes through the filters 2A to 2C, the intensity of the transmitted light can be altered.

Figure 4:
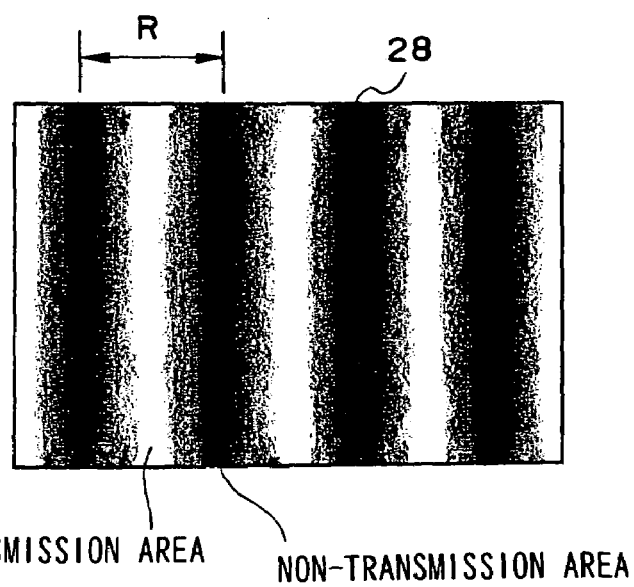
FIG. 4 shows the filter 2A at which a variable-density stripe filter pattern is formed.

For instance, when δ=0(deg) all the incoming light is transmitted, whereas when δ=90 (deg), the incoming light is completely blocked by the filter. Such control may be implemented individually for the filters 2A to 2C and various transmission patterns may be formed at the individual filters 2A to 2C. For instance, a variable-density stripe pattern such as that shown in FIG. 4 is observed from the side on which the photodiode 3 is present, at the filter 2B having formed therein a pattern in which transmission and non-transmission alternate in stripes, since the intensity level of the transmitted light changes in a stripe pattern. In the following explanation, this situation is described as "a variable-density stripe filter pattern such as that shown in FIG. 4 is formed at the filter 2B".

In the embodiment, a variable density filter pattern having the spatial frequency shown in FIG. 4 is individually formed at the filters 2A to 2C. Disposing such filters 2A to 2C within the light flux is equivalent to spatially modulating the light flux entering the filters. A modulated light flux is converted to an electric current corresponding to the level of the intensity of the light flux.

(Defocusing)

First, the defocusing extent, which is equivalent to the focal point offset quantity is explained. Let us now consider the situation shown in FIG. 5, in which a focal point 20 of the lens 8 is at a position x to the right of the filter 2B. The extent of blurring in the subject image at the position x can be expressed as the diameter r of a plane along which a circular cone 21 with its vertex set at the focal point 20 is cut through by the filter 2B. With θ representing the angle formed by the optical axis and the generating line of the circular cone, the diameter r is expressed as in (1) below.

$$r = 2x \tan \theta \quad (1)$$

Since tan θ in the system represents the product of the reciprocal of the F value (=focal length/aperture) of the lens and ½, r presenting the blurring extent can be expressed as in (2) below.

$$r = x/F \quad (2)$$

r in this expression can be regarded as an attenuation wavelength at the primary filter. Accordingly, the attenuation f of a subject image manifesting at a spatial wavelength R due to the blurring effect can be expressed as in (3) below.

$$f = 1/(1+i(x/RF)) \quad (3)$$

I in the following expression (4) assumes the absolute value of f and represents the attenuation attributable to the defocusing quantity x of the spatial frequency component at the wavelength R.

$$I = 1/(1+(x/RF)^2)^{1/2} \quad (4)$$

As explained later, the value of I corresponds to the intensity level of the light detected at the photodiode 3, and in the explanation of the embodiment, the intensity level of the detected light, too, is expressed as I.

(Focal Point Detection Method)

Figure 6:
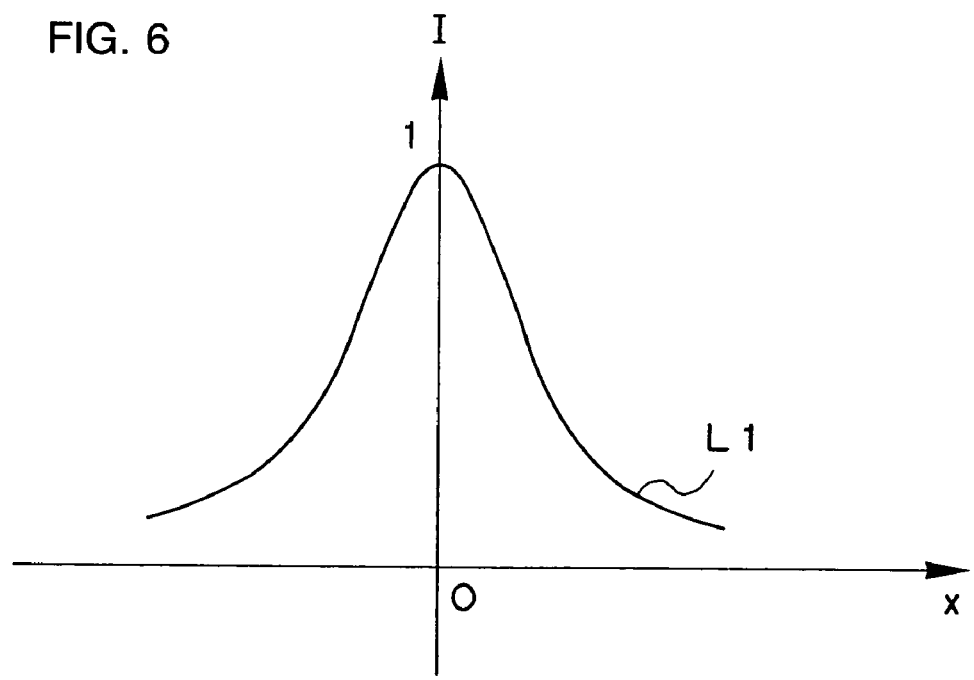
FIG. 6 shows the relationship between the defocus quantity x and I.

Expression (4) indicates that the attenuation of the spatial frequency component at the wavelength R is defined by the defocusing quantity x. This implies that once the spatial frequency component at the wavelength R is ascertained at a plurality of positions, the defocusing quantity x can be estimated. A curve L1 in FIG. 6 indicates the change in the value of I relative to the defocusing quantity x. When x=0, i.e., when the filter 2B is set at the focal point position, I=1, and the value of I becomes smaller as the absolute value of x increases. The spatial frequency component at the wavelength R at a specific position can be ascertained through a Fourier transformation of the light flux executed at the position.

The variable-density stripe filter pattern shown in FIG. 4 achieves a horizontal symmetry relative to the origin point set at the center of the image plane and has a transmission factor corresponding to the Fourier cos wave. It is to be noted that the wavelength R is equal to the distance from a given non-transmission area to the next non-transmission area. When the filter 2B having such a variable-density stripe filter pattern is inserted in the light flux, the light flux undergoes Fourier cos transformation as it is transmitted through the filter 2B. Namely, the intensity of the light flux advancing toward the photodiode 3 can be expressed as in (5) below.

$$I_\theta = Io \int f(x) \cos \theta_f dx \quad (5)$$

Io in the expression above is a coefficient indicating the transmission factor of the liquid crystal filter inclusive of the optical system. In addition, $\cos \theta_f$ represents the Fourier cos transformation.

In expression (5) θ represents the spatial frequency corresponding to the spatial wavelength R and $I_\theta$ represents the spatial frequency component at the wavelength R. It is to be noted that $I_\theta$ resulting from a Fourier sin transformation can be obtained by forming a variable-density stripe filter pattern with a transmission factor corresponding to the Fourier sin wave at the filter 2B. The focal point position may be calculated by adopting either transformation.

When the light flux having been modulated at the filter 2B as described above is received at the photodiode 3, the output of the photodiode 3 indicates the intensity level achieved by executing a Fourier transformation in hardware. If the wavelength R of the variable-density stripe filter pattern is altered, the Fourier transformation is executed in correspondence to the adjusted wavelength R. For this reason, when the outputs measured in correspondence to varying positions x are plotted on the x-I plane in FIG. 6, the data form a curve having a profile identical to that of the curve L1 in FIG. 6. In other words, the curve peaks at x=0.

As shown in FIG. 2, the detection unit 1 includes the three filters 2A, 2B and 2C disposed over the pitch d. Thus, three sets of data can be obtained for a single subject image by forming the variable-density stripe filter pattern at the filter 2A and forming a full transmission pattern at the remaining filters, by forming the variable-density stripe filter pattern at the filter 2B and forming a full transmission pattern at the remaining filters and by forming the variable-density stripe filter pattern at the filter 2C and forming a full transmission pattern at the remaining filters.

Figure 7:
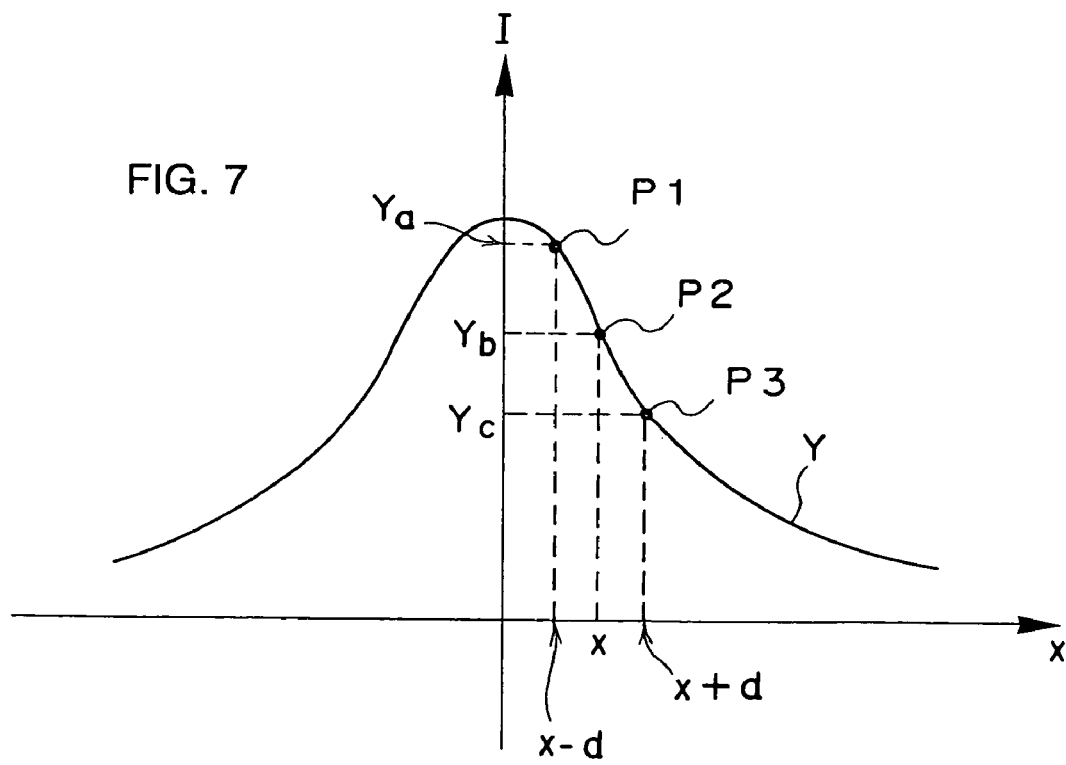
FIG. 7 presents measurement data P 1 through P 3.

It is assumed that the filter block 2 is disposed so as to set the filter 2B at a position conjugate with the image-capturing plane of the image-capturing device in the embodiment. Accordingly, the light intensity level Yb measured by forming the variable-density stripe filter pattern at the filter 2B is expressed as in (6) below. When the variable-density stripe filter pattern is formed at the filter 2A, the light intensity level Ya expressed as in (7) below is measured, whereas the light intensity level Yc expressed as in (8) below is measured when the variable-density stripe filter pattern is formed at the filter 2C. It is to be noted that a indicates the intensity of light measured when the light flux is not attenuated at all. In FIG. 7, the individual sets of measurement data P1 to P3 are plotted on the light intensity curve Y.

$$Yb = a/(1+(x/RF)^2)^{1/2} \quad (6)$$

$$Ya = a/(1+((x+d)RF)^2)^{1/2} \quad (7)$$

$$Yc = a/(1+((x-d)RF)^2)^{1/2} \quad (8)$$

Figure 5:
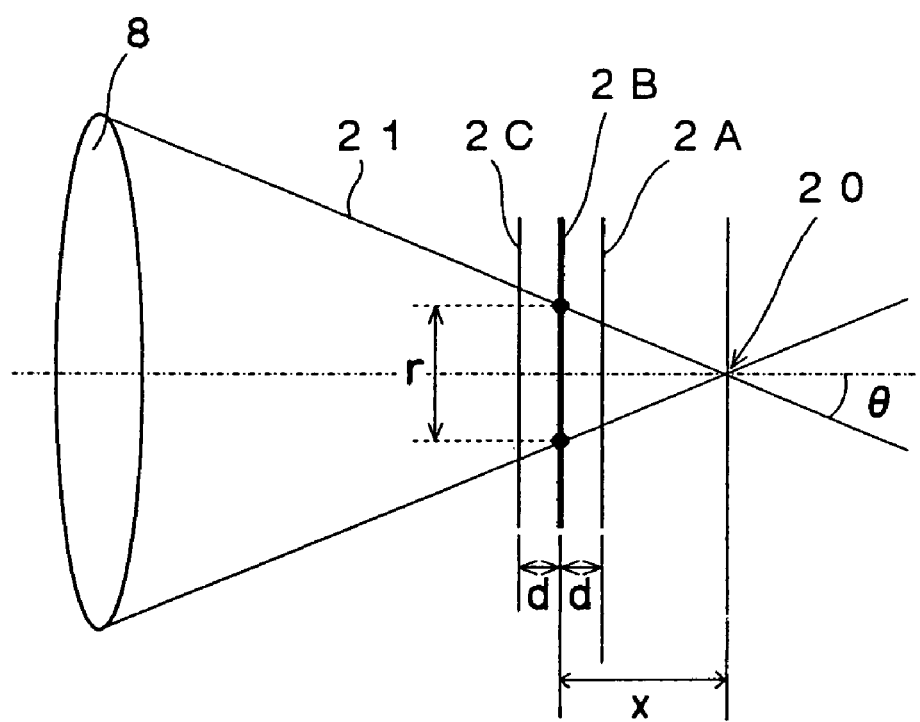
FIG. 5 illustrates an instance of defocusing.

By solving these equations (6) to (8), the position x of the filter 2B and the light intensity level a when there is no attenuation, which are unknowns, can be calculated. The position x is indicated with a positive value when the position x is located further toward the lens 8 relative to the focal point 20, as shown in FIG. 5. In the data example presented in FIG. 7, the focal point position of the lens 8 is set rearward relative to the filter 2B over the distance x from the filter 2B. In this case, by driving the lens 8 with the lens drive device 9 and moving the focal point position forward by the distance x, a focused state is achieved.

Providing three equations to ascertain two unknowns x and a, as in the example described above manifests redundancy. Accordingly, the attenuation constant r (see expression (3)) representing the blurring extent mentioned earlier, too, can be calculated based upon the measurement data obtained during the focal point detection. Since this constant r may not always accurately indicate the extent of a specific type of blurring depending upon the structure of the lens 8 or the position of the subject, it is desirable to execute the calculation by taking into consideration the actual structural and positional details.

(Filter Patterns)

Figure 8:
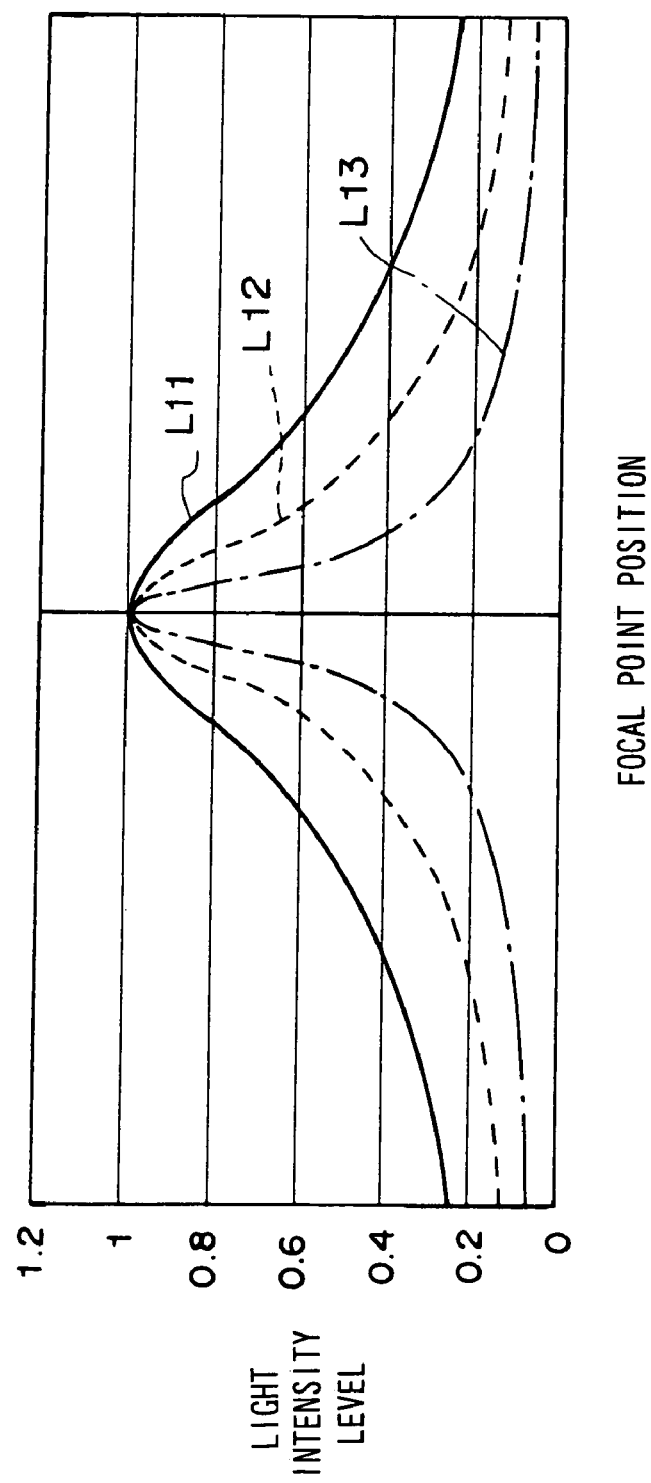
FIG. 8 shows light intensity levels I corresponding to varying wavelengths R.

Expression (4) presented earlier indicates that the intensity I is dependent on the spatial wavelength R at the individual filters 2A to 2C. Curves L11 to L13 in FIG. 8 indicate light intensity levels I corresponding to varying spatial wavelength R. The wavelength R2 corresponding to the curve L12 is expressed as R2=R1/2 with R1 representing the wavelength corresponding to the curve L11, whereas the wavelength R3 corresponding to the curve L13 is expressed as R3=R1/4. Namely, as the wavelength R of the stripe pattern becomes smaller, the curve peaks more steeply.

For this reason, when the focal point position is close to the filters 2A to 2C, the accuracy with which the focal point position is calculated by using the curve L13 indicating a more drastic change in the vicinity of the focal point position is higher. The data obtained when the focal point position is distanced from the filters 2A to 2C, on the other hand, indicate values toward the nadir of the curves L11 to L13, and for this reason, the focal point position can be calculated with greater use by using the curve 11 which manifests a relatively large change and achieves a larger output. In other words, when the defocusing quantity x is large, the wavelength R of the variable-density stripe filter pattern should be increased, whereas when the defocusing quantity x is small, a highly accurate focal point position detection can be achieved by reducing the wavelength R. For instance, when the autofocus system is mounted at a camera, R should be set to a large value when starting the AF (autofocus) operation and R should then be reduced as the focus state approaches a matched state. In addition, if the output value that has been obtained is smaller than a reference value indicating the minimum value needed to enable calculation, data should be reacquired by setting the wavelength R to a greater value. The reference value may be, for instance, k·Ic obtained by multiplying the DC component Ic of the light to be detailed later by a constant ratio k.

The sets of data P1 to P3 in FIG. 7 are sequentially obtained as the variable-density stripe filter pattern is formed at the filters 2A, 2B and 2C in this order. Since the light intensity levels I to be compared indicate levels of intensity of light corresponding to a single image, a subject should ideally remain still while the data are being taken. However, it is likely that the subject will move within the image plane, i.e., the phase shifts, in reality. Under such circumstances, the phase shift can be handled by taking the absolute values of both the real part (cos transformation) and the imaginary part (sin transformation) of the Fourier transformation instead of using only either part of the Fourier transformation.

More specifically, an absolute value Y as expressed in (9) below should be taken by using data Ycos obtained when a filter pattern defined with an even function (cos) is displayed at the center of the image plane and data Ysin obtained when a filter pattern defined with an odd function (cos) is displayed, relative to the center of the image plane.

$$Y=(Y^2_{cos}+Y^2_{sin})^{1/2} \quad (9)$$

While only the real part needs to be targeted under normal circumstances, the focal point position should be calculated to based upon the absolute value Y by displaying the stripes defined with the even function and the stripes defined with the odd function to achieve a more precise measurement. By adopting this method, an accurate focal point detection can be executed even when a pronounced vibration occurs.

(Actual Operation)

When detecting the light intensity level with the photodiode 3 by forming a filter pattern at the filters 2A to 2C, it is necessary to ascertain the contrast of the liquid crystals 12 at the filters 2A to 2C and also to obtain calibration data with regard to the photodiode 3, since a dark current flows at the photodiode 3 and thus, even when the liquid crystals 12 are in a transmitting state or a light blocking state, they do not allow 100% of the light to be transmitted or they do not block 100% of the light.

First, the liquid crystals 12 at all the filters 2A to 2C are set in a transmitting state and an output Ic from the photodiode 3 in this state is recorded. Next, an output Id from the photodiode 3 is recorded by setting one of the filters 2A to 2C in a full light blocking state. At this time, the remaining two filters are sustained in the transmitting state. While Id is measured by setting only one of the filters 2A to 2C in the light blocking state by assuming that the light blocking states at the filters 2A to 2C are all identical to one another, three outputs Id may be individually measured each by setting one of the filters in the full light blocking state instead. By executing the arithmetic operation with the three outputs Id, an even higher degree of accuracy is achieved in the focal point position calculation.

When the output from the photodiode 3 is Ir, the corresponding effective light intensity level I is calculated by subtracting the output Id attributable to the dark current from the detection value Ir as expressed in (10) below.

$$I=Ir-Id \quad (10)$$

The effective value Icc of the full open output achieved by setting all the filters 2A to 2C in the transmitting state is expressed as in (11), which constitutes a Fourier output (DC component) of degree zero.

$$Icc=Ic-Id \quad (11)$$

It is to be noted that Ic represents the output from the photodiode 3 achieved by setting the liquid crystals 12 is all the filters 2A to 2C in the transmitting state.

By using Icc as reference data, a decision can be made as to whether or not the value obtained through the measurement is reliable.

As explained earlier, when a filter having formed thereat the variable-density stripe filter pattern with a transmission factor corresponding to the cos wave such as that shown in FIG. 4, is inserted in a light flux, the light flux undergoes the Fourier cos transformation. By adjusting the spatial wavelength R of the variable-density stripe filter pattern, the Fourier transformation corresponding to the varying spatial wavelengths R are output from the photodiode 3. The output Icos is expressed as in (12) below by taking into consideration the output Id attributable to the dark current and the like.

$$I_{cos}=\int f(x)\cos\theta_f dx+(Ic+Id)/2 \quad (12)$$

In addition, by displaying the variable-density stripe filter pattern in FIG. 4 with its phase offset by π/2, a Fourier sin transformation expressed as in (13) is effected.

$$I_{sin}=\int f(x)\sin\theta_f dx+(Ic+Id)/2 \quad (13)$$

In the expression given above, sin $\theta_f$ represents the Fourier sin transformation.

Ycos and Ysin in expression (9) explained earlier are obtained by eliminating the offset component (the second term) from Icos and Isin respectively.

Figure 9:
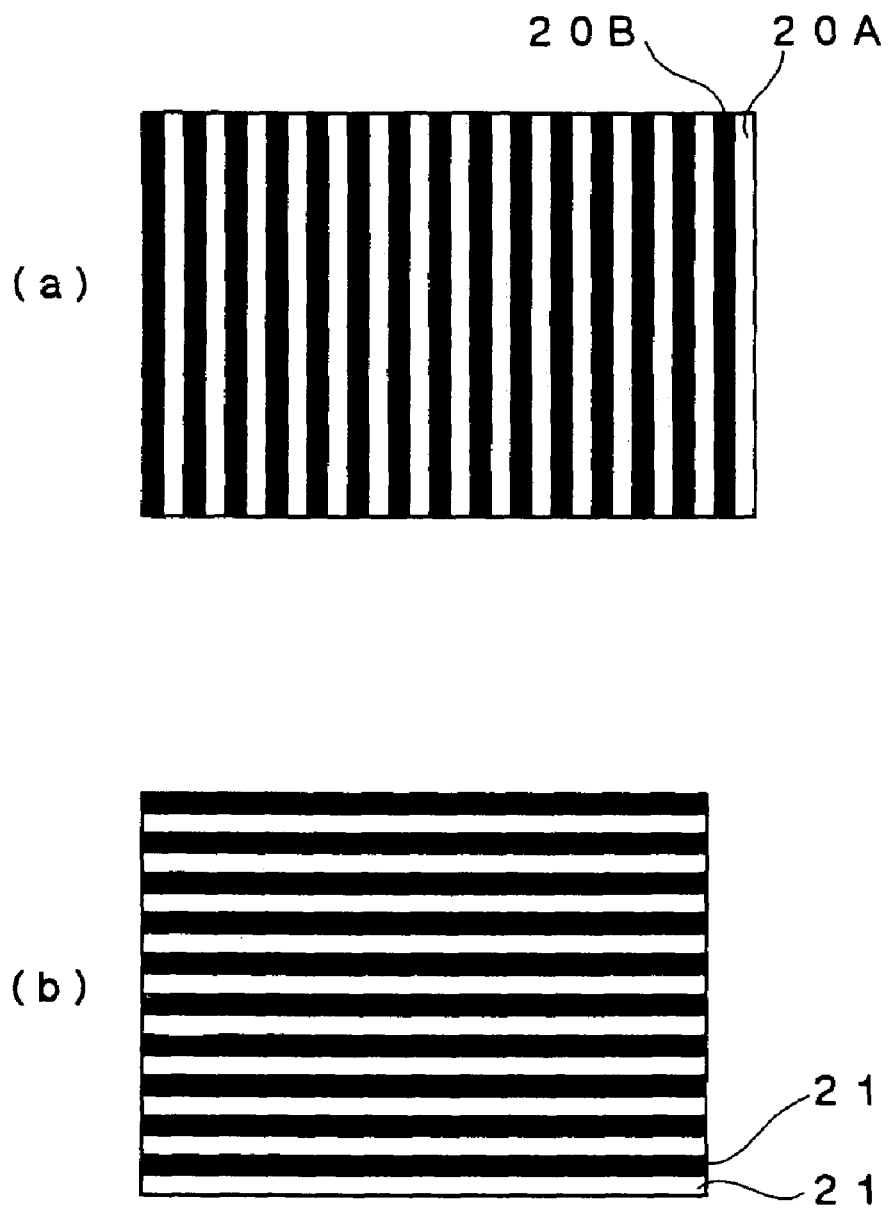
FIG. 9 shows filter patterns, with FIG. 9(a) showing longitudinal stripes and FIG. 9(b) showing lateral stripes.

If the filters 2A to 2C are constituted with general-purpose liquid crystal panels 15, as shown in FIG. 3, the level of quantization becomes a factor to be taken into consideration when displaying a variable-density stripe filter pattern with an extremely small wavelength. In such a case, a rectangular wave with the harmonic component the nature of which is well known, should be used instead of a single cos wave (or sin wave). FIG. 9 shows such filter patterns, with FIG. 9(a) showing longitudinal stripes and FIG. 9(b) showing lateral stripes. In FIG. 9(a), a fully transmitting longitudinal stripe area 20A and a fully light blocking longitudinal stripe area 20B are set alternately and repeatedly along the horizontal direction. In FIG. 9(b), a fully transmitting lateral stripe area 21A and a fully light blocking lateral stripe area 21B are set alternately and repeatedly along the vertical direction.

Although not ideal, a rectangular wave can be used in practical applications virtually without problems, unlike a single sin wave or cos wave. In addition, taking into consideration the difficulty of displaying gradations with a liquid crystal, the rectangular wave which enables a simple display can be handled with greater ease than a sin wave or cos wave.

It is to be noted that if the subject manifests almost no change in contrast along the lateral direction, the output value becomes extremely small and thus the arithmetic operation cannot be executed if a modulation is executed by using the longitudinal stripe pattern such as that shown in FIG. 4 or in FIG. 9(a). Accordingly, a lateral stripe pattern such as that shown in FIG. 9(b) is formed to calculate the focal point position in such a case. If, on the other hand, the subject does not manifest a substantial change in contrast along the longitudinal direction, the output value obtained by using a lateral stripe pattern will be extremely small and accordingly, the focal point position is calculated by forming a longitudinal stripe pattern. In addition, a stripe pattern with diagonal stripes instead of longitudinal stripes or lateral stripes may be used. In this case, it is possible to calculate the focal point with ease when the subject manifests little change in contrast along either the longitudinal direction or the lateral direction.

(Example of Variation)

While three filters 2A to 2C each having a liquid crystal 12 constitute the filter block 2 in the first embodiment described above, the number of filters does not need to be three. Namely, a greater number of filters may be used as long as the Fourier transformation output values from all the filters can be detected within a range in which the image can still be regarded as a still image when a large number of frames are displayed at the liquid crystals 12. A greater number of filters will lead to an improvement in the accuracy of the arithmetic operation. However, at present, the length of time for the on/off operation at the liquid crystals 12 limits the number of filters that can be provided.

Figure 10:
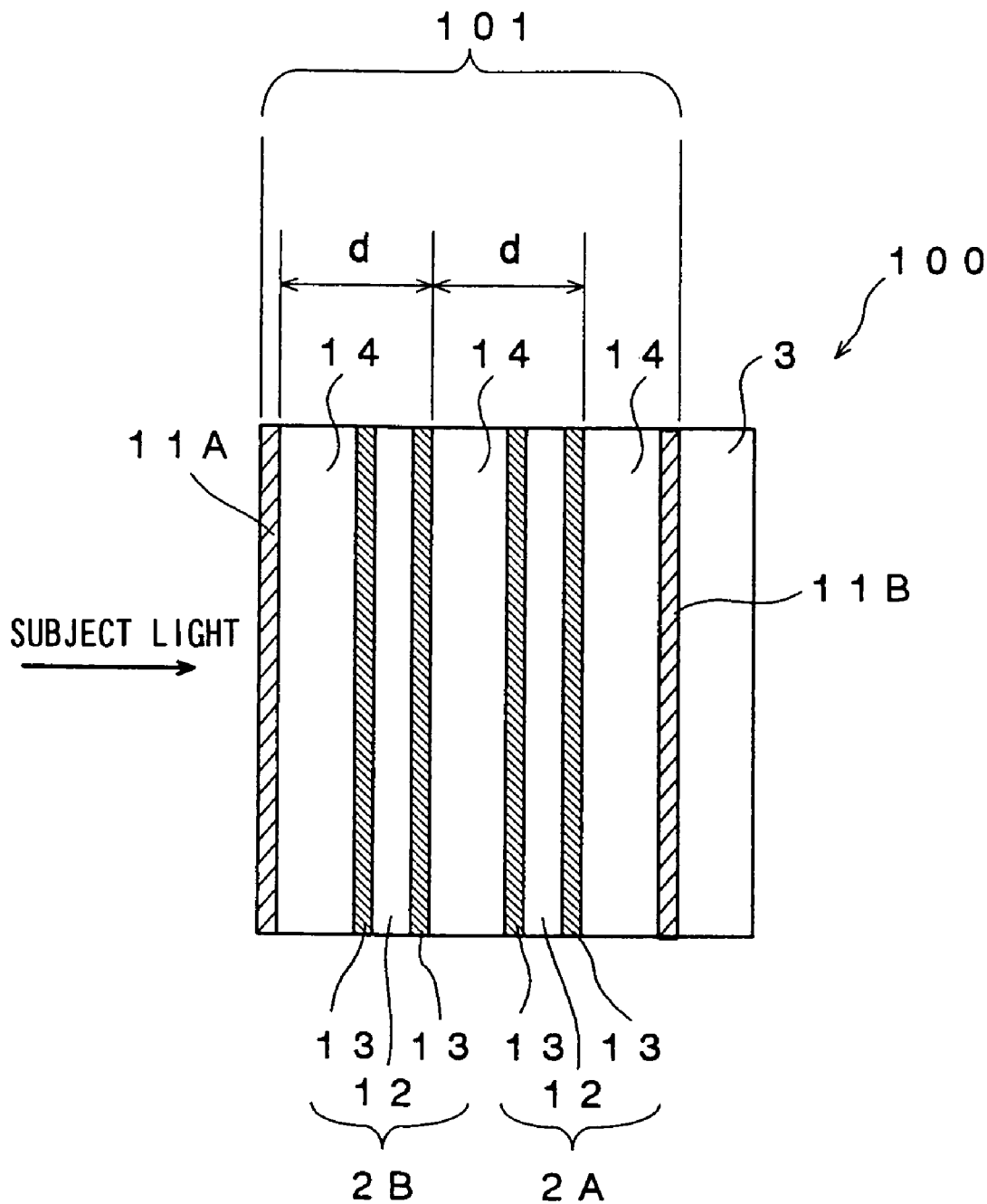
FIG. 10 shows the detection unit 100 having two filters 2A and 2B.

As expressions (6) through (8) indicate, in the equations of the intensity levels Y, there are only two unknowns, x and a. For this reason, the minimum requirements with regard to the number of filters is two, and the structure of the device can be simplified by using a smaller number of filters. At a detection unit 100 shown in FIG. 10, a filter block 101 includes two filters 2A and 2B. The detection unit 100 in FIG. 10 differs from the detection unit 1 in FIG. 2 only in the number of filters it includes, and structural details of the filters 2A and 2B are identical to those of the filters in FIG. 2. In this device, two sets of data defined as in expressions (6) and (7) explained earlier are obtained through measurement, and thus, x and a can be determined by solving the equations (6) and (7). However, if Ya=Yb, the filters 2A and 2B are assumed to be at positions on the two sides of the focal point, over distances equal to each other from the focal point position and the focal point is considered to be at the middle position between the filters 2A and 2B, i.e., x+d/2.

Second Embodiment

Figure 11:
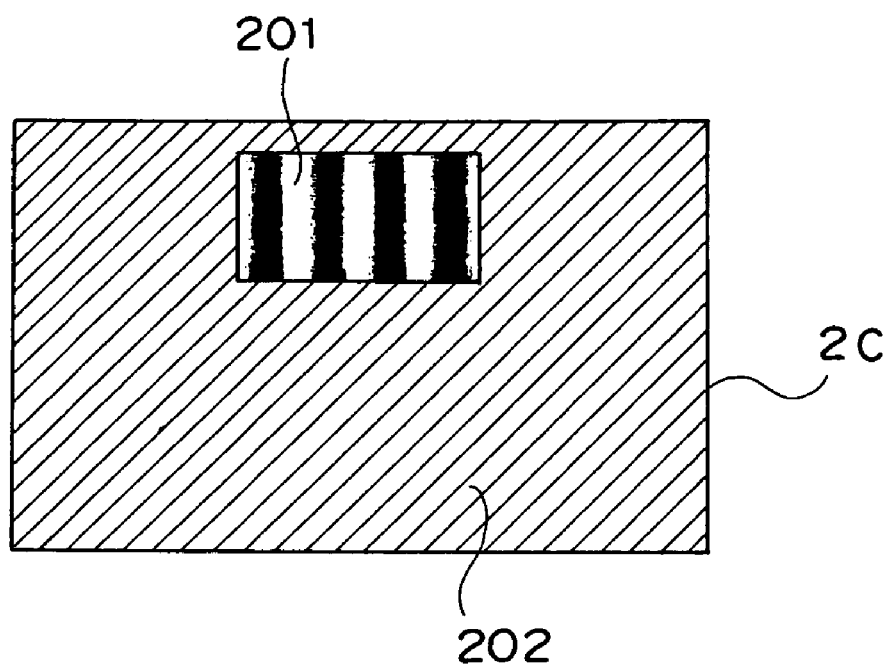
FIG. 11 shows the filter pattern display at the filter 2C in a second embodiment.

While the focal point detection is executed by using the entire light flux from the lens 8 in the first embodiment, a focal point detection may instead be executed by using a light flux in a given specific area of the image plane. FIG. 11 shows a filter pattern displayed at the filter 2C. A rectangular window 201 is formed in the filter pattern, and a variable-density stripe pattern similar to that shown in FIG. 4 is formed in the area corresponding to the window 201. The area outside the window 201 is in a full light blocking state. It is to be noted that the shape of the window 201 does not need to be rectangular. If the filter 2C is a liquid crystal filter, the window 201 may be formed at any position, in any size and in any shape, as long as the requirements regarding the quantization to be achieved with the pixels are taken into consideration.

While the full-open output Ic is detected as the calibration data by setting all the filters 2A to 2C in a state of full transmission in the first embodiment, the filter having formed therein the window 201 is set in a state of full transmission only over the area corresponding to the window 201 in the second embodiment. Thus, Ic is provided as a local variable which changes in correspondence to the form adopted for the window 201. It is to be noted that the filters other than the filter 2C with the window 201, i.e., the filters 2A and 2B, are set in a state of full transmission as in the first embodiment.

Filter control methods that may be adopted during the focal point detection, i.e., during the Fourier transformation, include the following.

Figure 12:
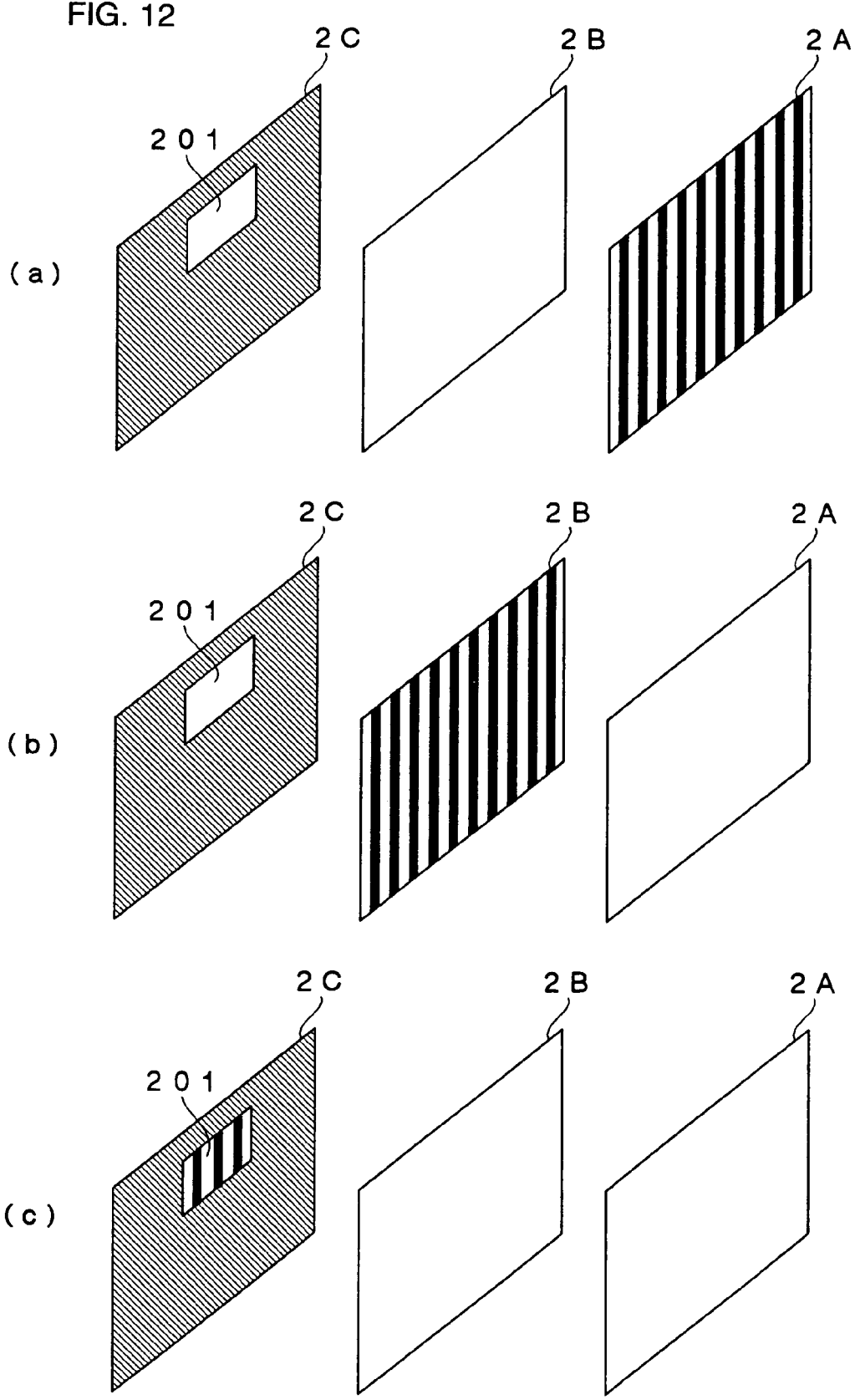
FIG. 12 illustrates a method adopted to control the filters 2A to 2C, with FIG. 12(a) showing the first procedure, FIG. 12(b) showing the second procedure and FIG. 12(c) showing the third procedure.

In a first method, the window 201 is formed at a specific filter, e.g., the filter 2C, among the filters 2A to 2C. The data can be obtained by first forming the window 201 at the filter 2C and setting the entire area inside the window 201 in a transmitting state, as shown in FIG. 12(a). The filter 2B is set in a state of full transmission, and a variable-density stripe filter pattern similar to that shown FIG. 4 is formed at the filter 2A. The output from the photodiode 3 is obtained as first data in this state.

Next, the filter 2A is set in a state of full transmission and the variable-density stripe filter pattern is formed at the filter 2B, as shown in FIG. 12(b). The state of the filter 2C remains unchanged from that shown in FIG. 12(a). Second data are obtained in the state shown in FIG. 12(b). Lastly, the filters 2A and 2B are both set in a state of full transmission, as shown in FIG. 12(c). A variable-density stripe filter pattern similar to that formed at the filters 2A and 2B as shown in FIGS. 12(a) and 12(b) is displayed in the area within the window 20l formed at the filter 2C. Third data are obtained in the state shown in FIG. 12(c). Then, the focal point position is calculated through a procedure similar to that adopted in the first embodiment by using the three sets of data. It is to be noted that the calculation procedure is not explained here.

Figure 13:
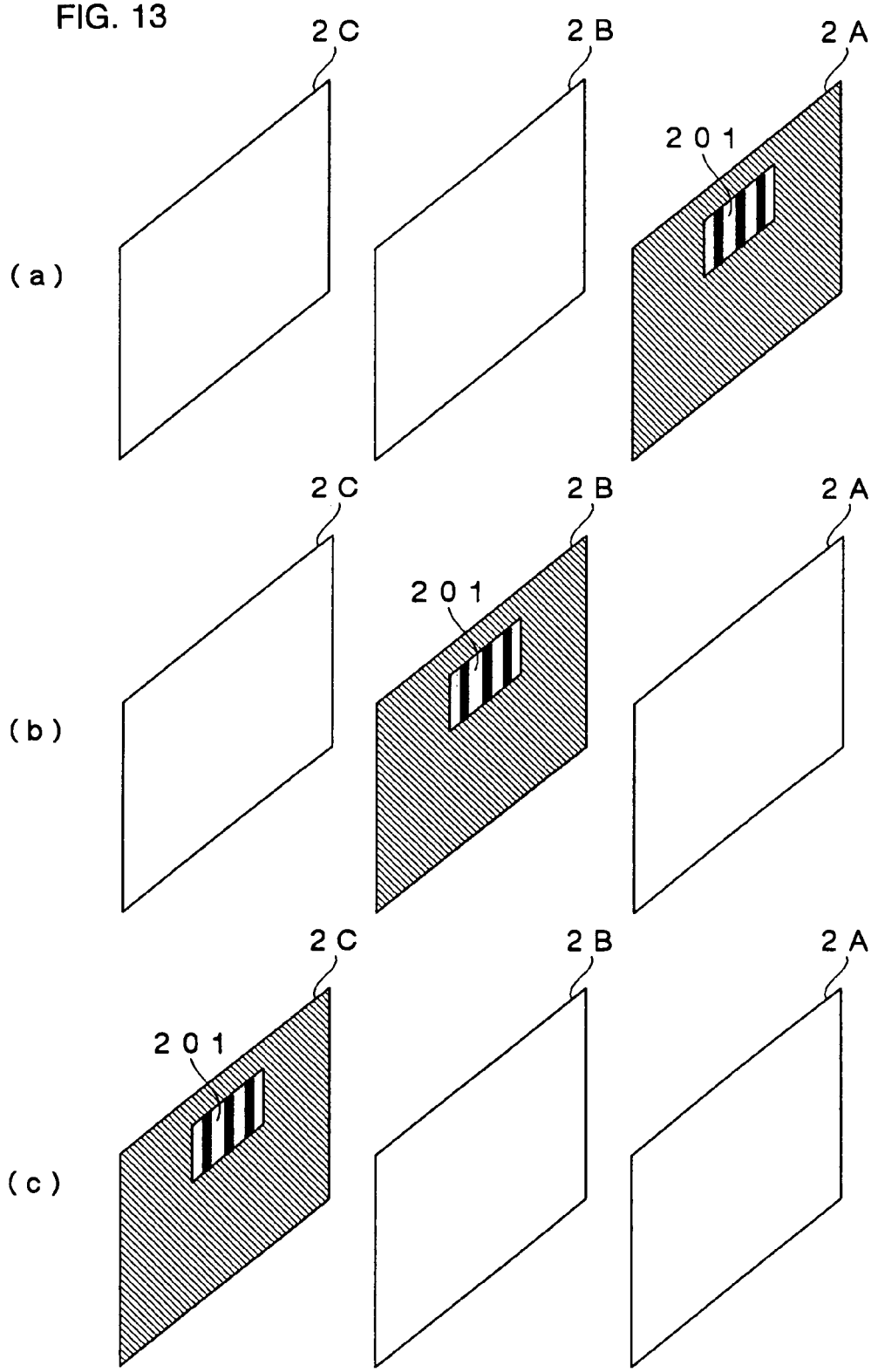
FIG. 13 illustrates the second method adopted to control the filters 2A to 2C with FIG. 13(a) showing the first procedure, FIG. 13(b) showing the second procedure and FIG. 13(c) showing the third procedure.

In a second method, a window 201 having a variable-density stripe filter pattern is sequentially formed at the filters 2A to 2C as shown in FIG. 13. First, the window 201 is formed at the filter 2A and the variable-density stripe filter pattern is displayed inside the window 201, as shown in FIG. 13(a). At this time, the other filters 2B and 2C are in a state of full transmission. First data are obtained in the state shown in FIG. 13(a).

Next, as shown in FIG. 13(b), the window 201 with the variable-density stripe filter pattern displayed therein is formed at the filter 2B and the filters 2A and 2C are set in a state of full transmission to obtain second data. Lastly, as shown in FIG. 13(c), the window 201 with the variable-density stripe filter pattern displayed therein is formed at the filter 2C and the filters 2A and 2B set in a state of full transmission to obtain third data. Then, the focal point position is calculated through a procedure similar to that adopted in the first embodiment by using the three sets of data.

In the first method, all the data are obtained with the window 201 formed at the same filter 2C. Thus, there is an advantage in that the area of the light flux cut off with the window 201 remains unchanged at all times. This is a crucial advantage from the viewpoint of assuring the required level of accuracy in a device that detects the light fluxes resulting from the Fourier transformation executed at the individual filters 2A to 2C and calculates the focal point position by comparing the detection results. It is to be noted that the window 201 used to cut off the light flux should be formed at the filter 2C, which is the closest to the lens 8 when adopting this method.

The second method, in which light flux areas cut off with the window 201 to obtain the individual sets of data vary, requires correction. For instance, the position of the window 201 may need to be corrected based upon the distance from the optical axis to the edge of the window 201. For further accuracy, the correction needs to be executed by taking into consideration the position of the focal point relative to the filters, and for this reason, if the focal point position of the lens 8 is altered when executing a focusing operation, the correction must be re-executed accordingly. These factors make it extremely difficult to achieve a highly accurate correction. It is to be noted that while the variable-density stripe filter pattern is formed inside the window 201 in the first and second methods described above, a filter having a window 201 alone formed therein may be provided and, in this case, three filters at which the variable-density stripe filter pattern is formed may be provided in addition to the filter with the window 201.

There are cameras known in the related art that execute a focusing operation by selectively using one of a plurality of focus areas at which a focus-match can be achieved formed on the image plane. In this embodiment, too, a similar focusing operation can be executed by selectively using a window 201 formed at one of a plurality of window forming areas. For instance, as shown in FIG. 14(a), five window forming areas 202a, 202b, 202c, 202d and 202e may be set on the image plane at the filter 2C with a window 201 formed at one of the five window forming areas. FIG. 14(b) shows the window 201 formed at the area 202c. It is to be noted that the number of window forming areas does not need to be five, and that the shape of the window 201 does not need to be rectangular.

(Photometering)

The intensity level of the light detected by setting the window 201 in a state of full transmission corresponds to the term of degree zero in the Fourier transformation, i.e., the DC component, which is defined by the window 201. Thus, by adjusting the shaped or the position of the window 201 in a state of full transmission as appropriate, the intensity level of light at any area on the screen can be measured. This is equivalent to the multiple split photometering adopted in cameras and the like. In this application, too, the window 201 is formed at the filter 2C. During a photometering operation, the window 201 is set in a transmitting state, and the other filters 2A and 2B are set in a state of full transmission.

As described above, a focal point detection can be executed by forming the variable-density stripe filter pattern over the area where the window 201 is formed and a photometering operation can be executed by setting the window 201 in a state of full transmission in the embodiment. In photometering systems in the related art, the absolute value of the output from the photodiode constituting the light-receiving element is directly used, and the accuracy is bound to be lowered by the adverse effect of the dark current. In contrast, a dark state can be created by setting the filters 2A to 2C an a full light blocking state and thus, the effective light intensity level can be measured exclusively by ascertaining the differences between the full transmitting state and the full light blocking state. As a result, a highly accurate photometering operation can be executed.

It is to be noted that while areas at which the window 201 can be formed are set in advance as shown in FIG. 14(a) in the example explained above, the filters 2A to 2C are liquid crystal filters and thus, the window 201 can be formed at any position on the display screen. A photometering operation can be executed at any desired position on the screen by forming the window 201 at the desired position.

Third Embodiment

Figure 15:
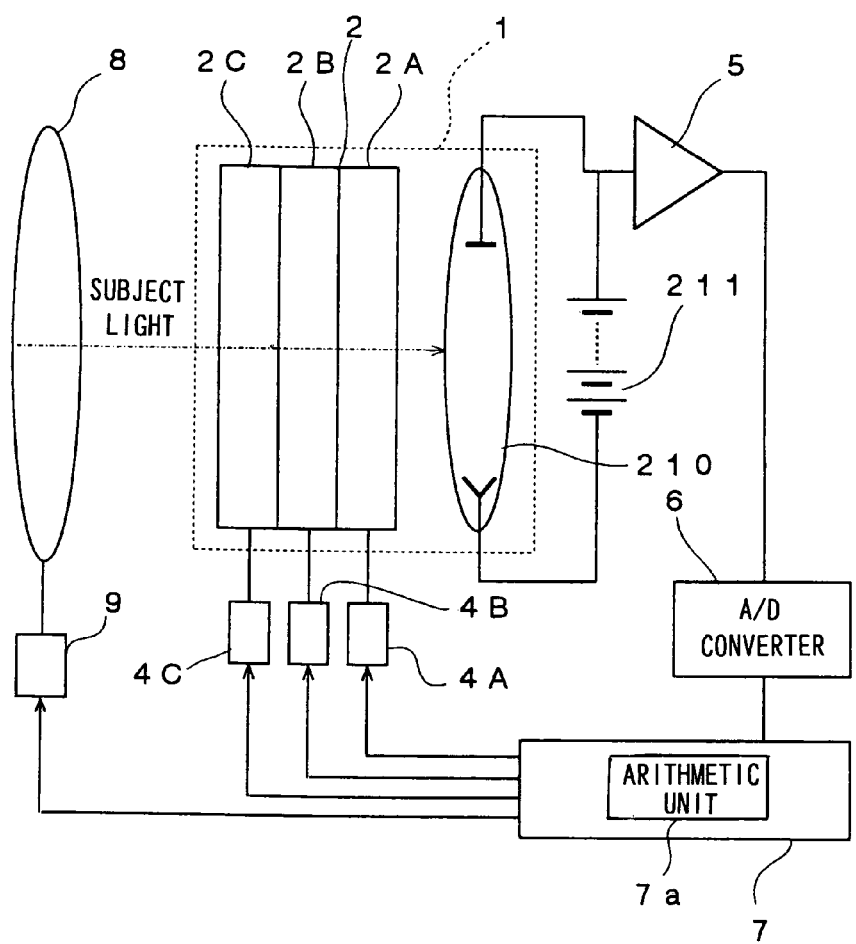
FIG. 15 is a block diagram of the focal point detection device achieved in a third embodiment of the present invention.

FIG. 15 shows the focal point detection device achieved in the third embodiment of the present invention in a block diagram similar to that presented in FIG. 1. In the focal point detection device in FIG. 15, a photomultiplier 210, instead of the photodiode 3 in FIG. 1, is used to constitute the light-receiving element. Reference numeral 211 indicates a power supply for the photomultiplier 210. As weak subject light passes through the filter block 2 and enters a photoelectric surface of the photomultiplier 210, photo electrons are emitted from photoelectric surface. The photo electrons are amplified through a secondary electron emission and ultimately, a signal having been amplified by a factor of 500,000 to 1 million is output from the photomultiplier 210. The signal output from the photomultiplier 210 is amplified at the amplifier 5 and is then input to the A/D converter. Other structural features are completely identical to those in the device shown in FIG. 1. Since details of the structure adopted in the filter block 2, the focal point detection operation and the like are similar to those in the first and second embodiments, their explanation is omitted.

Since focal point detection devices in the related art adopt a system in which the focal point is detected by determining the specific the position of the image, it requires a device that is capable of positional detection such as a CCD element to constitute the light-receiving element. For this reason, the types of light-receiving elements that can be used are limited and a photomultiplier that is effective in applications in which weak light is detected but is not capable of positional detection cannot be utilized. However, the focal point detection device in the embodiment, which calculates the focal point position by comparing the light intensity levels, does not require a positional detection function at the light-receiving element. Thus, the photomultiplier 210 shown in FIG. 15 can be utilized as the light-receiving element to enable a focal point detection using extremely weak subject light. For instance, this structure may be adopted in an autofocus mechanism to be used in very low light conditions such as in starlight that require exposure to be executed over an extended length of time. Furthermore, in conjunction with an objective lens adopting a specific structure, the focal point detection device in the embodiment may be used as a range finder in almost complete darkness.

Figure 16:
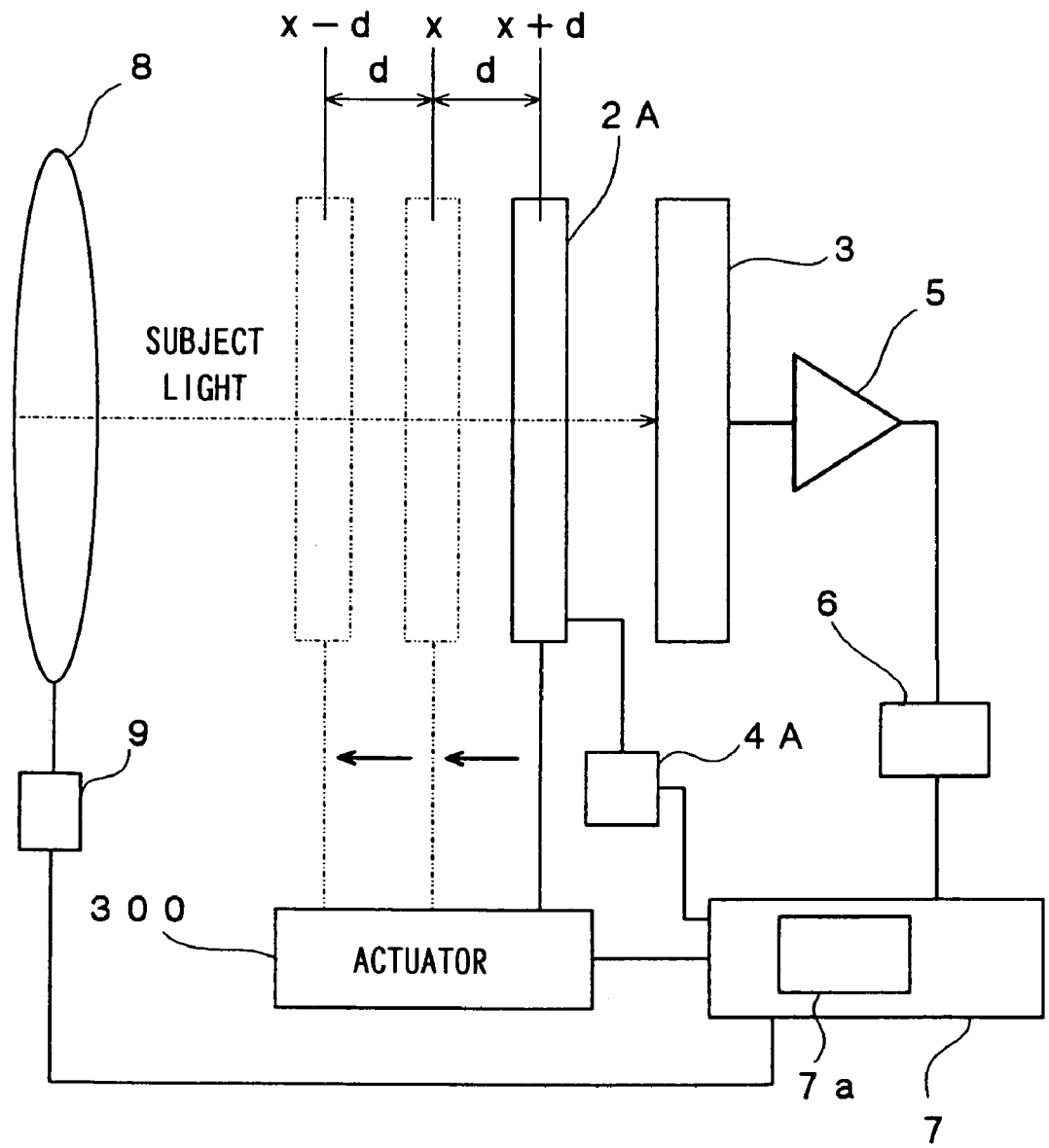
FIG. 16 is a block diagram of a structure adopted to drive one of the filters, i.e., the filter 2A, with the actuator 300.

While the subject light flux is modulated by providing three or two filters at the filter block 2 in the embodiments described above, one of the filters, i.e., the filter 2A, may be driven with an actuator 300, as shown in FIG. 16. In this case, the detection value obtained at the photodiode 3 by setting the filter 2A having the variable-density stripe filter pattern formed therein to the position x+d is used as the first data. Then, the filter 2A is positioned to the position x by moving it toward the subject or the distance d and the detection value obtained at the photodiode 3 in the state is used as the second data. Next, the filter 2A is set to the position x–d by moving it toward the subject over the distance d and the detection value obtained at the photodiode 3 in this state is used as the third data. The focal point position is then calculated based upon the three sets of data. It is to be noted that the actuator may be constituted by using, for instance, a piezoelectric element.

While an explanation is given above on an example in which the transmission-type liquid crystal filters (liquid crystal display elements) 2A to 2C are used as the spatial modulation optical filters, filters other than liquid crystal filters may be instead used as long as they have transmission characteristics with a spatial frequency wavelength R. In addition, a CdS may be used as the photoelectric conversion unit instead of the photodiode 3 or the photomultiplier 210. The focal point detection device and the focus system explained above may be mounted any of various other types of optical apparatuses including microscopes and telescopes with which an image is optically photographed and observed, as well as in cameras.

What is claimed is:

1. A focal point detection device comprising:
   a plurality of spatial modulation optical filters having adjustable transmission characteristics which individually and selectively modulate an image-forming light flux from an optical system, the plurality of spatial modulation optical filters located at individually different positions on an optical axis;
   a photoelectric conversion unit that sequentially receives the image-forming light flux sequentially passed through the plurality of spatial modulation optical filters and sequentially outputs signals, each of the signals corresponding to an intensity level of received light for a different modulation state of the plurality of spatial modulation optical filters; and
   an arithmetic unit that calculates a focal point position of the optical system based upon the signals output from the photoelectric conversion unit.

2. A focal point detection device, comprising:
   a plurality of transmission-type liquid crystal filters disposed at different positions on an optical axis, which an image-forming light flux from an optical system sequentially enters;
   a liquid crystal control unit that controls the individual transmission-type liquid crystal filters so as to form a transmission characteristics pattern with a predetermined spatial frequency at one of the plurality of transmission-type liquid crystal filters with the remaining transmission-type liquid crystal filters set in a state of full transmission;
   a photoelectric conversion unit that receives a light flux having been transmitted through the plurality of transmission-type liquid crystal filters and outputs a signal corresponding to an intensity level of the received light; and
   an arithmetic unit that calculates a focal point position of the optical system based upon individual signals from the photoelectric conversion unit which are obtained by sequentially forming the transmission characteristics pattern at the plurality of transmission-type liquid crystal filters.

3. A focal point detection device, comprising:
   a plurality of transmission-type liquid crystal filters disposed at different positions on an optical axis, which an image-forming light flux from an optical system sequentially enters;
   a liquid crystal control unit that controls the individual transmission-type liquid crystal filters so as to form an aperture pattern at one of the plurality of transmission-type liquid crystal filters, to form a transmission characteristics pattern with a predetermined spatial frequency at one of the remaining transmission-type liquid crystal filters or at the aperture pattern and to set any transmission-type liquid crystal filter at which neither the aperture pattern nor the transmission characteristics pattern is formed in a state of full transmission;
   a photoelectric conversion unit that receives a light flux having been transmitted through the plurality of transmission-type liquid crystal filters and outputs a signal corresponding to an intensity level of the received light; and
   an arithmetic unit that calculates a focal point position of the optical system based upon individual signals from the photoelectric conversion unit which are obtained by sequentially forming the transmission characteristics pattern at the plurality of transmission-type liquid crystal filters.

4. A focal point detection device according to claim 3, wherein:
   the liquid crystal control unit implements control so as to form the aperture pattern at a desired position within a display area of the transmission-type liquid crystal filter.

5. A focal point detection device according to claim 2, wherein:
   the transmission characteristics pattern is a variable-density stripe pattern that repeats over a cycle corresponding to the predetermined spatial frequency.

6. A focal point detection device according to claim 5, wherein:
   the arithmetic unit obtains filtering data defined by an even function at the photoelectric conversion unit by forming a first variable-density stripe pattern at the liquid crystal filter, obtains filtering data defined by an odd function by forming a variable density pattern manifesting a 90° phase difference relative to the first variable-density stripe pattern at the liquid crystal filter and calculates the focal point position based upon the filtering data.

7. A focal point detection device according to claim 6, wherein:
   the arithmetic unit calculates the focal point position by using an average value of absolute values of the filtering data defined by the even function and the filtering data defined by the odd function.

8. A focal point detection device according to claim 2, further comprising:
   a frequency control unit that alters the spatial frequency.

9. A focal point detection device according to claim 8, wherein:
   the frequency control unit reduces the spatial frequency under conditions in which an extent of offset from the focal point position of the optical system is significant and increases the spatial frequency under conditions in which the extent of offset is small.

10. A focal point detection device according to claim 2, wherein:

the photoelectric conversion unit comprises a photodiode, a photomultiplier or a CdS, having a light-receiving area large enough to receive the light flux from the optical system in full.

11. A focal point detection device according to claim 2, wherein:

the plurality of liquid crystal filters are provided as an integrated optical block having each liquid crystal filter set between transparent glass plates, a first polarizing plate that converts an incident light flux to linearly polarized light is disposed at a light flux entry surface of the optical block and a second polarizing plate having a polarization angle equal to the polarization angle of the first polarizing plate is disposed at a light flux exit surface of the optical block.

12. A focal point detection device according to claim 2, wherein:

three liquid crystal filters are provided.

13. A focus system comprising:

an optical system that forms a subject image;

a focal adjustment unit that adjusts a focal point position of the optical system;

a focal point detection device according to any of claims 1 through 12; and a focus control unit that controls the focal adjustment unit to set the focal point position of the optical system to a specific position based upon the focal point position detected by the focal point detection device.

14. A camera comprising a focus system according to claim 13.

15. A focal point detection method comprising steps of:

modulating an image-forming light flux from an optical system at different positions on an optical axis by using spatial modulation optical filters having transmission characteristics with a predetermined spatial frequency;

sequentially receiving at a photoelectric conversion unit light fluxes obtained by modulating the image-forming light flux at the different positions; and calculating a focal point position of the optical system based upon signals sequentially output by the photoelectric conversion unit.

16. A focal point detection method according to claim 15, wherein:

a pattern of the transmission characteristics is a variable-density stripe pattern that repeats over a cycle corresponding to the predetermined spatial frequency.

17. A focal point detection method according to claim 16, wherein:

the focal point position is calculated based upon filtering data defined by an even function which are obtained at the photoelectric conversion unit by forming a first variable-density stripe pattern at the spatial modulation optical filter and filtering data defined by an odd function which are obtained at the photoelectric conversion unit by forming a variable density pattern manifesting a 90° phase difference relative to a phase of the first variable-density stripe pattern at the spatial modulation optical filter.

18. A focal point detection method according to claim 17, wherein:

the focal point position is calculated by using an average value of absolute values of the filtering data defined by the even function and the filtering data defined by the odd function.

* * * * *